(12) United States Patent
Pfluegler et al.

(10) Patent No.: US 8,197,784 B2
(45) Date of Patent: Jun. 12, 2012

(54) METHOD FOR THE PRODUCTION OF TRICHLOROSILANE

(75) Inventors: Bernhard Pfluegler, Burghausen (DE); Robert Ring, Burghausen (DE)

(73) Assignee: Wacker Chemie AG, Munich (DE)

( * ) Notice: Subject to any disclaimer, the term of this patent is extended or adjusted under 35 U.S.C. 154(b) by 121 days.

(21) Appl. No.: 12/444,486

(22) PCT Filed: Oct. 12, 2007

(86) PCT No.: PCT/EP2007/060858
§ 371 (c)(1),
(2), (4) Date: Apr. 6, 2009

(87) PCT Pub. No.: WO2008/049740
PCT Pub. Date: May 2, 2008

(65) Prior Publication Data
US 2010/0008842 A1  Jan. 14, 2010

(30) Foreign Application Priority Data
Oct. 25, 2006 (DE) .......................... 10 2006 050 329

(51) Int. Cl.
*C01B 33/107* (2006.01)
(52) U.S. Cl. ........................................ 423/342; 423/341
(58) Field of Classification Search .................. 423/341, 423/342
See application file for complete search history.

(56) References Cited

U.S. PATENT DOCUMENTS

| | | | |
|---|---|---|---|
| 2,595,620 A | 5/1952 | Wagner et al. | |
| 2,657,114 A | 10/1953 | Wagner | |
| 2,943,918 A | 7/1960 | Pauls | |
| 3,933,985 A | 1/1976 | Rodgers | |
| 4,217,334 A | 8/1980 | Weigert et al. | |
| 4,309,259 A * | 1/1982 | Sarma et al. | 204/164 |
| 4,526,769 A * | 7/1985 | Ingle et al. | 423/342 |
| 4,676,967 A | 6/1987 | Breneman | |
| 2002/0187096 A1* | 12/2002 | Kendig et al. | 423/350 |
| 2004/0047793 A1* | 3/2004 | Mleczko et al. | 423/342 |
| 2004/0047794 A1* | 3/2004 | Pfaffelhuber et al. | 423/342 |
| 2007/0073075 A1 | 3/2007 | Paetzold et al. | |
| 2008/0112875 A1 | 5/2008 | Garcia-Alonso | |

FOREIGN PATENT DOCUMENTS

| | | |
|---|---|---|
| CA | 1210220 A1 | 8/1986 |
| DE | 3024319 A1 | 1/1982 |
| DE | 33 11 650 A1 | 10/1983 |
| DE | 10 2005 005 044 A1 | 8/2006 |
| DE | 102005005004 A1 | 8/2006 |
| DE | 10 2005 046 703 A1 | 4/2007 |
| JP | 60081010 A | 9/1985 |
| WO | 2006081980 A2 | 8/2006 |

* cited by examiner

*Primary Examiner* — Ngoc-Yen Nguyen
(74) *Attorney, Agent, or Firm* — Brooks Kushman P.C.

(57) ABSTRACT

High yields of trichlorosilane are achieved in the reaction of tetrachlorosilane and hydrogen at a temperature in the range of 900° C. to 1300° C. and a pressure above the critical pressure of the reactants.

11 Claims, No Drawings

US 8,197,784 B2

METHOD FOR THE PRODUCTION OF TRICHLOROSILANE

CROSS-REFERENCE TO RELATED APPLICATION

This application is the U.S. national phase of PCT Appln No. PCT/EP2007/060858 filed Oct. 12, 2007 which claims priority to German application DE 10 2006 050 329.5 filed Oct. 25, 2006.

BACKGROUND OF THE INVENTION

1. Field of the Invention

The invention relates to a process for preparing trichlorosilane by means of thermal hydrogenation in the supercritical pressure range.

2. Description of the Related Art

The reaction of trichlorosilane with hydrogen to produce polycrystalline silicon results in formation of large amounts of tetrachlorosilane. The tetrachlorosilane can be converted back into trichlorosilane and hydrogen chloride by tetrachlorosilane converting, namely a catalytic or thermal dehydrohalogenation reaction of tetrachlorosilane with hydrogen. Two process variants are known for converting tetrachlorosilane into trichlorosilane. Low-temperature converting is carried out in the presence of silicon and a catalyst at temperatures in the range from 400° C. to 700° C. The U.S. Pat. Nos. 2,595,620, 2,657,114 (Union Carbide and Carbon Corporation/Wagner 1952) and U.S. Pat. No. 2,943,918 (Compagnie de Produits Chimiques et electrometallurgiques/Pauls 1956) report a partial hydrogenation of tetrachlorosilane in the presence of catalysts (e.g. metallic chlorides).

Since the presence of catalysts, e.g. copper, can lead to contamination of the trichlorosilane and the polycrystalline silicon produced therefrom, a second process, for example the high-temperature process, has been developed. In this process, the starting materials tetrachlorosilane and hydrogen are reacted without catalyst at higher temperatures than in the low-temperature process to form trichlorosilane. Tetrachlorosilane converting is an endothermic process in which the promotion of the products is equilibrium limited. To obtain a significant yield of trichlorosilane at all, high temperatures (>900° C.) have to prevail in the reactor. Thus, U.S. Pat. No. 3,933,985 (Motorola INC/Rodgers 1976) describes the reaction of tetrachlorosilane with hydrogen to form trichlorosilane at temperatures in the range from 900° C. to 1200° C. and a molar ratio of $H_2:SiCl_4$ of from 1:1 to 3:1. Trichlorosilane yields of 12-13% are achieved in this reaction.

U.S. Pat. No. 4,217,334 (Degussa/Weigert 1980) describes an optimized process for converting tetrachlorosilane into trichlorosilane by hydrogenation of tetrachlorosilane by means of hydrogen in a temperature range from 900° C. to 1200° C. As a result of a high molar ratio of $H_2:SiCl_4$ (up to 50:1) and a liquid quench of the hot product gas to below 300° C. (liquid: product or inert liquid, cooling times: 50 ms), significantly higher trichlorosilane yields (up to about 35% at an H2:SiCl4 ratio of 5:1) are achieved. Disadvantages of this process are the significantly higher proportion of hydrogen in the reaction gas and the quench by means of a liquid, since both these greatly increase the energy consumption and thus the costs of the process. The quench is necessary in order to "freeze" the reaction equilibrium which is on the $SiHCl_3$ and HCl side, and is effected by immediate quenching with $SiCl_4$ from 1100° C. to 300° C., which is energetically unsatisfactory and therefore expensive.

The abstract of JP60081010 (Denki Kagaku Kogyo K.K./1985) describes a quenching process at lower $H_2:SiCl_4$ ratios to increase the trichlorosilane content in the product gas. The temperatures in the reactor are from 1200° C. to 1400° C. The reaction mixture is cooled to below 600° C. within one second. In this quenching process, too, most of the energy of the reaction gas is lost, which has a serious adverse effect on the economics of the process.

DE 3024319 describes a continuous process in which a mixture of tetrachlorosilane and hydrogen reacts at 900-1300° C. in a high-temperature reactor and in which the hydrogen chloride formed is, after cooling in an after-reactor, reacted over a silicon catalyst at from 280 to 350° C. to form further trichlorosilane. The unreacted tetrachlorosilane and the unreacted hydrogen are recirculated to the high-temperature reactor. This process is preferably carried out at from 1 to 6 bar. To increase the energy efficiency of the process, a heat exchanger unit is integrated into the high-temperature reactor in DE 3024319.

Owing to the increasing economic importance of the production of polycrystalline silicon, e.g. for photovoltaics, and continually increasing energy prices, increased efforts have been made in recent years to make the primary energy usage in silane converting based on the trichlorosilane yield more efficient.

SUMMARY OF THE INVENTION

It was an object of the invention to provide an inexpensive process for preparing trichlorosilane by means of thermal hydrogenation of tetrachlorosilane, which provides a high trichlorosilane yield with improved economics as compared to the prior art. These and other objects are achieved by a process in which a tetrachlorosilane-containing feed gas is reacted with a hydrogen-containing feed gas at a temperature of from 900° C. to 1300° C. to form a trichlorosilane-containing product mixture, characterized in that the reaction is carried out at a supercritical pressure of the feed gases.

DETAILED DESCRIPTION OF THE PREFERRED EMBODIMENTS

The tetrachlorosilane-containing feed gas preferably consists of tetrachlorosilane. The hydrogen-containing feed gas preferably consists of hydrogen. The trichlorosilane-containing product mixture preferably consists of trichlorosilane, hydrogen chloride and unreacted feed gases.

The reaction rate at which the chemical equilibrium is established increases with increasing pressure. At a pressure above the critical pressure of the mixture of the feed gases (the feed mixture), the chemical equilibrium is established virtually independently of the residence time of the feed gases in the reaction space. A pressure increase to above the critical pressure of the feed mixture does not increase the trichlorosilane yield further, so that a pressure above the critical pressure of the feed mixture is selected as optimal pressure.

The critical pressure of hydrogen is about 12.9 bar, and the critical pressure of tetrachlorosilane is 35.9 bar. The critical pressure of the mixture is given by the mol fraction of the components in the mixture multiplied by the critical pressure of the individual component. The mixture is supercritical as soon as the system pressure is greater than the critical pressure of the mixture. This is the case, for example, at 18.7 bar for a molar ratio of tetrachlorosilane:$H_2$=1:3.

The reaction is preferably carried out at a pressure of greater than 12.9 bar, preferably in the range from 12.9 to 100 bar. The reaction is more preferably carried out at a pressure of 12.9-35.9 bar, i.e. in the supercritical pressure range of an $H_2$/tetrachlorosilane mixture. The reaction is most preferably carried out at a pressure of 14-24 bar.

Tetrachlorosilane and hydrogen are preferably present in a molar ratio of from 1:1 to 1:100. The molar ratio of tetrachlorosilane:$H_2$ is more preferably in the range from 1:1 to 1:10 and most preferably in the range from 1:1 to 1:3. The increased efficiency achieved thereby is shown, for a given reactor size, by an increased space-time yield of trichlorosilane and by greater energy efficiency of the overall process.

The process of the invention takes place, as is customary for the high-temperature process, without addition of further components such as a catalyst. The reaction is preferably carried out at a temperature of 950-1200° C.

The residence time of the feed gases in the reaction zone is preferably 200-0.05 seconds, more preferably from 10 to 0.1 seconds.

The product mixture is subsequently cooled, preferably to 300° C. within a cooling time of from 200 to 0.05 seconds, more preferably from 10 to 0.1 seconds. Cooling is preferably carried out by means of a countercurrent heat exchanger, e.g. as described in DE 3024319.

A significantly improved trichlorosilane yield is obtained under the conditions described. At the abovementioned residence times and cooling times to 300° C., a trichlorosilane yield of about 11-12% by weight is achieved at a pressure of 1 bar and a molar ratio of 1:3. When the pressure is increased to 5 bar, a trichlorosilane yield of about 13.5% by weight of trichlorosilane is achieved. At higher pressures in the region of the critical pressure of the feed stream, the highest trichlorosilane yield of almost 20% is achieved.

The process of the invention makes possible a high trichlorosilane yield combined with energy recovery. In addition, at a given reactor size, it makes possible a higher space-time yield than conventional processes, an associated reduction of the heat given off by the reactor, and a decrease in size of the peripheral apparatuses, e.g. the heat exchanger.

The process of the invention makes possible a high trichlorosilane yield combined with energy recovery. In addition, at a given reactor size, it makes possible a higher space-time yield than conventional processes and an associative reduction of the heat given off by the reactor and a decrease in size of the peripheral apparatuses, e.g. the heat exchanger.

The process of the invention can be carried out in a customary reactor for the hydrogenation of $SiCl_4$. It is preferably carried out in a reactor whose interior walls which come into contact with the reaction gases are lined with components based on silicon nitride or silicon carbide or consist of these materials. Such a reactor is known, for example, from DE 102005046703.

If the reactor consists of the unalloyed carbon steel normally used in the high-temperature reaction, the temperature of the reactor wall should be kept below 200° C. by means of a cooling medium. For this purpose, the reactor is preferably provided with a double wall through which the cooling medium flows. Possible cooling media are water and also silanes such as $SiCl_4$. As an alternative and to avoid the need for cooling, the reactor can also be made of a more highly alloyed steel, e.g. X12CrMo7.

The process of the invention is preferably carried out at a system pressure of the feed stream in the supercritical range, by which is meant the abovementioned pressure ranges, and at a system pressure of the product stream in the subcritical range, by which is meant a system pressure which is less than the critical pressure of the product mixture. This is achieved, for example, by the product mixture being depressurized immediately after the reaction zone. The process of the invention is most preferably carried out in a reactor having an integrated heat exchanger.

The invention is illustrated below with the aid of examples and comparative examples. The experiments described in the examples were carried out in a fused silica reactor surrounded by a pressure-resistant steel sheet. The total reactor volumes with integrated heat exchanger can be pressurized. The pressure is generated by means of hydrogen which is compressed to the desired pressure by a compressor. This reactor will hereinafter be referred to as high-temperature reactor.

EXAMPLE 1

A gas mixture of 25 mol % of tetrachlorosilane and 75 mol % of hydrogen was reacted at a temperature of 950° C. and the pressure steps shown in table 1 and a residence time of one sec. in a high-temperature reactor. The gas mixture is preheated in a heat exchanger unit by the hot gases flowing from the reactor and finally passed through a high-temperature reactor at a temperature of 950° C. The composition of the product gas leaving the reactor, a mixture of $SiHCl_3$ (TCS) and $SiCl_4$ (STC), was determined by means of a gas chromatograph. The measured values are shown in table 1.

TABLE 1

| Pressure [bar] | TCS content (measured) [% by weight] |
| --- | --- |
| 1 | 12.3 |
| 6 | 13.5 |
| 10 | 14.1 |
| 19 | 18.9 |
| 24 | 19.8 |
| 30 | 19.8 |

The STC content is in each case 100% by weight -TCS content.

These results show that the reaction rate at a residence time of about one second increases considerably at an increased pressure and that no significant increase in the TCS yield occurs after the critical pressure of the feed mixture is reached (here 18.6 bar).

EXAMPLE 2

A gas mixture of 25 mol % of tetrachlorosilane and 75 mol % of hydrogen was preheated in a heat exchanger unit by the hot gases flowing from the reactor and finally passed through a high-temperature reactor at a temperature of 950° C. The residence time in the reactor is 50 msec or 500 msec or 5 seconds. The cooling time from the reactor is kept constant at about one second. The pressure was varied as shown in table 2. The composition of the product gas leaving the reactor, viz. a mixture of $SiHCl_3$ and $SiCl_4$, was determined by means of a gas chromatograph. The measured values are shown in table 2.

TABLE 2

| Pressure | Trichlorosilane [% by weight] 50 msec residence time | Trichlorosilane [% by weight] 500 msec residence time | Trichlorosilane [% by weight] 5 sec residence time |
| --- | --- | --- | --- |
| 1 | 11.8 | 12.0 | 12.0 |
| 10 | 12.8 | 13.3 | 14.0 |

TABLE 2-continued

| Pressure | Trichlorosilane [% by weight] 50 msec residence time | Trichlorosilane [% by weight] 500 msec residence time | Trichlorosilane [% by weight] 5 sec residence time |
|---|---|---|---|
| 19 | 18.6 | 18.8 | 18.6 |
| 24 | 19.2 | 19.7 | 19.3 |

The example shows that the production rate in the pressure range>pcrit (here 18.6 bar) is independent of the residence time in the reaction space.

The invention claimed is:

1. A process for converting tetrachlorosilane to trichlorosilane, comprising reacting a tetrachlorosilane-containing feed gas with a hydrogen-containing feed gas at a temperature of from 900° C. to 1300° C. at a supercritical pressure of 19 to 24 bar of the feed gases to form a trichlorosilane-containing product mixture, and removing the product mixture from the reactor.

2. The process of claim 1, wherein tetrachlorosilane and hydrogen are present in a molar ratio of from 1:1 to 1:100.

3. The process of claim 1, wherein tetrachlorosilane and hydrogen are present in a molar ratio of from 1:1 to 1:10.

4. The process of claim 1, wherein tetrachlorosilane and hydrogen are present in a molar ratio of from 1:1 to 1:3.

5. The process of claim 1, wherein the feed gases reside in the reaction zone for 200 to 0.05 seconds.

6. The process of claim 1, wherein the feed gases reside in the reaction zone for 10 to 0.1 seconds.

7. The process of claim 1, wherein the process is carried out at a system pressure of the feed stream in the supercritical range and a system pressure of the product stream in the subcritical range.

8. The process of claim 7, wherein the system pressure of the product stream in the subcritical range is achieved by depressurization after the reaction zone.

9. The process of claim 1, wherein the reactor temperature is from 900° C. to about 950° C.

10. The process of claim 1, wherein the product mixture is cooled to 300° C. within a cooling time of 200 to 0.05 seconds.

11. The process of claim 1, wherein the product mixture is cooled to 300° C. within a cooling time of 10 to 0.1 seconds.

* * * * *